(12) United States Patent
Hsu et al.

(10) Patent No.: US 7,447,047 B2
(45) Date of Patent: Nov. 4, 2008

(54) POST REGULATION CONTROL CIRCUIT OF POWER SUPPLY

(75) Inventors: Da-Jing Hsu, Taipei County (TW); Hui-Qiang Yang, Taipei County (TW)

(73) Assignee: Niko Semiconductor Co., Ltd., Sijhih, Taipei County (TW)

( * ) Notice: Subject to any disclaimer, the term of this patent is extended or adjusted under 35 U.S.C. 154(b) by 249 days.

(21) Appl. No.: 11/544,805

(22) Filed: Oct. 10, 2006

(65) Prior Publication Data
US 2008/0084715 A1   Apr. 10, 2008

(51) Int. Cl.
*H02M 3/335* (2006.01)
(52) U.S. Cl. .................. 363/21.01; 363/21.04
(58) Field of Classification Search ........... 363/16, 363/20, 21.01, 21.04–21.07, 21.1, 21.11
See application file for complete search history.

(56) References Cited

U.S. PATENT DOCUMENTS

| | | | | |
|---|---|---|---|---|
| 6,356,466 B1 * | 3/2002 | Smidt et al. | ............. | 363/21.17 |
| 6,385,058 B1 * | 5/2002 | O'Meara | ................. | 363/21.01 |
| 6,987,679 B2 * | 1/2006 | Gan et al. | ................. | 363/89 |
| 7,116,087 B2 * | 10/2006 | Zhang et al. | ............... | 323/272 |

* cited by examiner

*Primary Examiner*—Matthew V Nguyen
(74) *Attorney, Agent, or Firm*—Muncy, Geissler, Olds & Lowe, PLLC

(57) ABSTRACT

In a post regulation control circuit mainly used in a switching power supply with several sets of outputs, the circuit adopts leading edge synchronization and conduction time regulation for the control, and a leading edge of the waveform of an input voltage of a detected secondary inductor generates a sync signal to reset a ramp generator to produce a stable continuous ramp signal, and compares with a feedback voltage to generate a power conduction signal corresponding to a stable output voltage. After the power conduction signal is cut off, a flywheel conduction signal in an inverted phase is produced. The two signals separately have an output terminal for driving two power switches of power conduction and flywheel conduction. The circuit applicable for various AC or DC step-down regulators gives a stable regulation control for the switching power supply with several alternating outputs.

5 Claims, 5 Drawing Sheets

POST REGULATION CONTROL CIRCUIT OF POWER SUPPLY

FIELD OF THE INVENTION

The present invention relates to a post regulation control circuit of a power supply, and more particularly to a circuit that reset a continuous ramp voltage by a leading edge trigger.

BACKGROUND OF THE INVENTION

Referring to FIGS. 1 and 2 for a circuit diagram and a waveform diagram of a traditional post regulation control circuit respectively, the post regulation control circuit detects a sync signal (trailing edge trigger) produced by a trailing edge of a voltage waveform of a secondary coil of a transformer T1 and uses the sync signal as a reset signal for resetting a ramp generator. For each reset signal, the ramp voltage is discharged to zero and then reset to a maximum electric potential to produce a stable continuous ramp voltage. Further, the voltage of an input signal is divided by an impedance Z1 and a resistor R2 and outputted through an error amplifier, and then an inverting amplifier (−GAIN amplifier) produces a feedback voltage directly proportional to the output voltage. After the feedback voltage is compared with the ramp voltage, a power conduction signal (HS-DRV) corresponding to a stable output voltage is produced. After the power conduction signal (HS-DRV) is cut off, a flywheel conduction signal (LS-DRV) in an inverted phase will be produced. The power conduction signal (HS-DRV) drives a power conduction power switch SW1 to be conducted electrically, and the flywheel conduction signal (LS-DRV) drives a flywheel conduction power switch SW2 to be conducted electrically, and the delay control circuit produces an output delay to prevent a short circuit when the two power switches are conducted electrically at the same time. Referring to FIG. 1 for a circuit diagram of a traditional post regulation control circuit, a ramp generator in a discontinuous conduction mode (DCM) produces unstable ramp voltages easily which may adversely affect the stability of the output voltage.

Therefore, finding a way of designing a post regulation control circuit of a power supply that produces a stable output voltage for a power supply in a discontinuous conduction mode (DCM) is a subject of the present invention.

SUMMARY OF THE INVENTION

In view of the shortcomings of the structure of a traditional post regulation control circuit, the inventor of the present invention based on years of experience in the related industry to conduct researches and experiments, and finally invented a post regulation control circuit of a power supply in accordance with the present invention, in hope of resetting a ramp generator by a leading edge trigger to produce a continuous ramp voltage in order to achieve the purpose of stably outputting a voltage from a power supply.

Therefore, it is a primary objective of the present invention to provide a post regulation control circuit of a power supply that resets a ramp generator by a leading edge trigger to produce a continuous ramp voltage, so as to achieve the purpose of stably outputting a voltage from a power supply.

A post regulation control circuit of a power supply in accordance with the invention comprises: a trigger circuit coupled to a inductor of secondary side of a transformer of the power supply; a ramp generator coupled to a trigger circuit; a first comparator having a positive input terminal coupled to a ramp generator; a feedback regulation controller coupled to a negative input terminal of the first comparator and a second output terminal of the power supply, and the feedback regulation controller sends a feedback voltage signal to a negative input terminal; a SR flip-flop having a R input terminal coupled to a first output terminal of the first comparator, and a S input terminal coupled to a trigger circuit; a first delay circuit coupled to a positive Q output terminal of the SR flip-flop; a second delay circuit coupled to an opposite Q output terminal of the SR flip-flop; a first inductor coupled to a first output terminal; a second inductor coupled to a second output terminal; a first power switch coupled to a first output driver, the first inductor and the second inductor; a second power switch coupled to a second output driver, the first power switch, the second inductor and a reference ground; wherein the trigger circuit detects the waveform of a voltage at a leading edge or between a leading edge and a trailing edge and inputted by a secondary inductor, and triggers a pulse signal to reset the voltage of a ramp generator, such that the voltage of the ramp generator is discharged to a first positive voltage and then recharged to a second positive voltage to further produce a continuous ramp voltage. After the first comparator compares the feedback voltage signal and the continuous ramp voltage, the output of the first comparator and a sync pulse signal are inputted to a R input terminal and a S input terminal of the SR flip-flop to produce a power conduction signal and a flywheel conduction signal. After the power conduction signal is delayed by the first delay circuit, the power conduction signal is inputted to the first output driver to control and conduct a first power switch, so that the power of the power supply is sent to a second output terminal and stored at a second inductor. After the power conduction signal is cut off, the first power switch will be disconnected, and after the flywheel conduction signal is delayed by a second delay circuit, the flywheel conduction signal is inputted to a second output driver to control and electrically conduct a second power switch, and send the power stored at the second inductor to the second output terminal so as to stabilize the output voltage of the power supply.

The above and other objects, features and advantages of the present invention will become apparent from the following detailed description taken with the accompanying drawing.

DETAILED DESCRIPTION OF THE PREFERRED EMBODIMENTS

To make it easier for our examiner to understand the objective, innovative features and performance of the present invention, we use a preferred embodiment and the accompanying drawings for a detailed description of the present invention.

Figure 1:
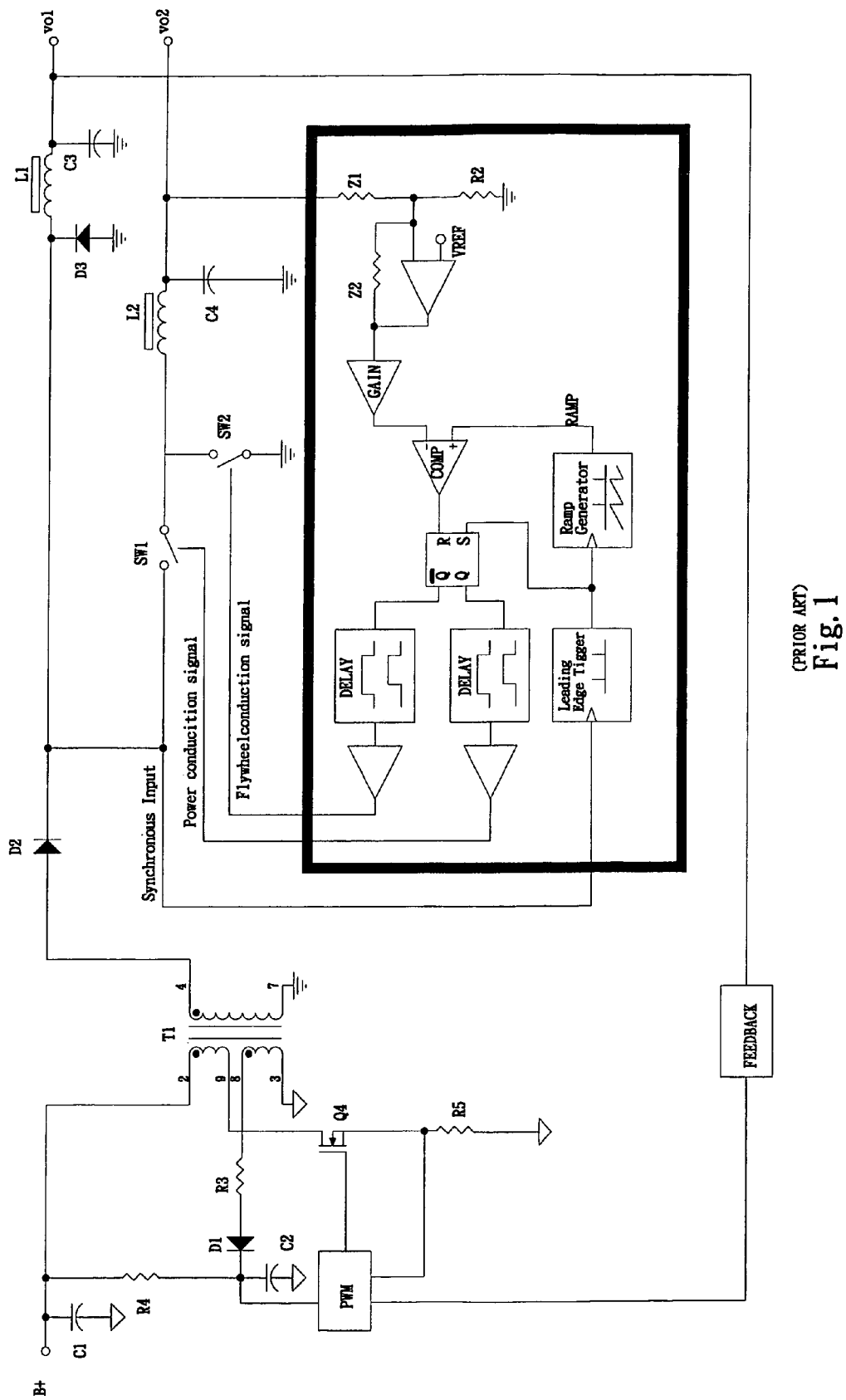
FIG. 1 is a circuit diagram of a traditional post regulation control circuit.
Figure 2:
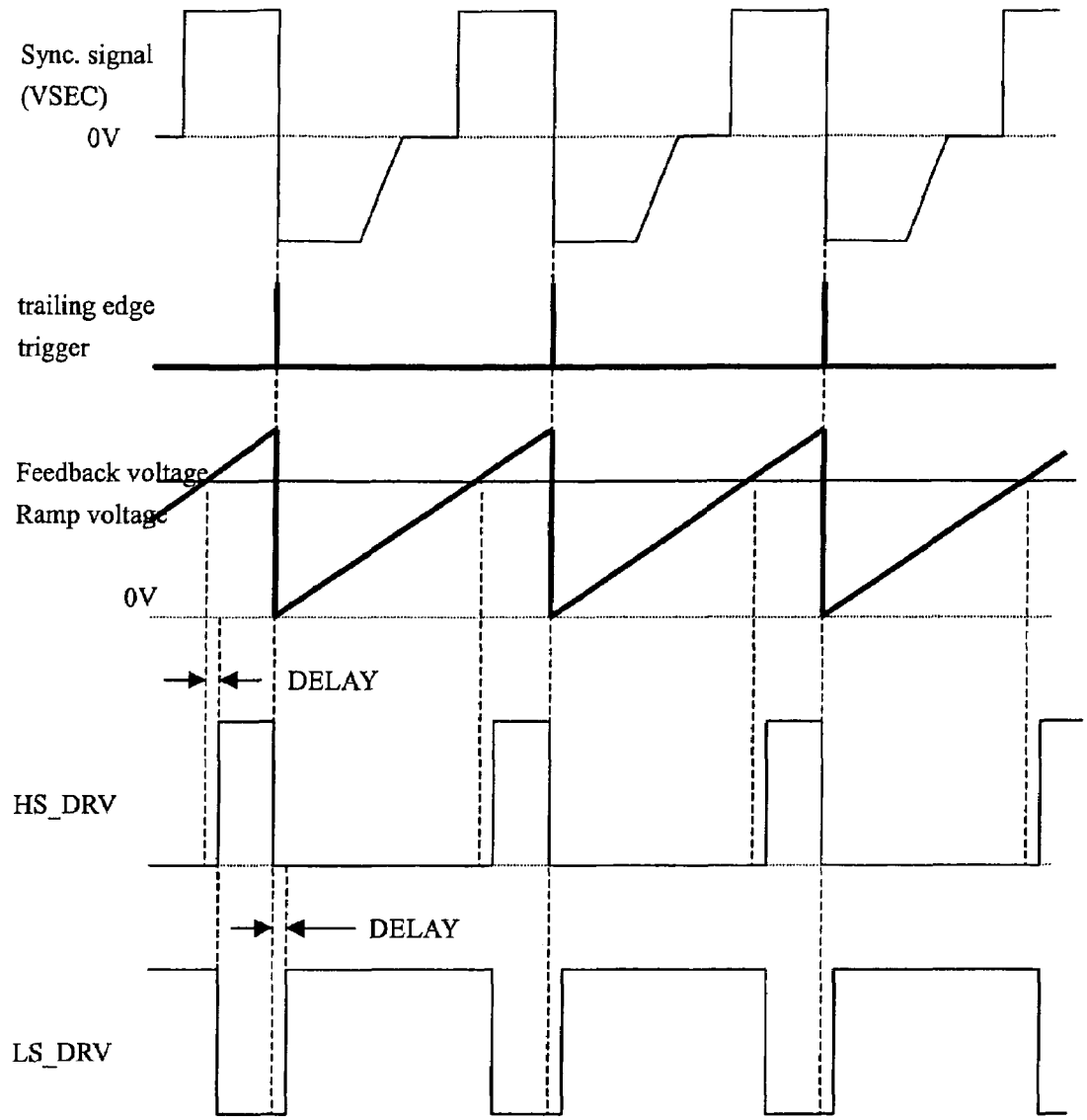
FIG. 2 is a waveform diagram of a traditional post regulation control circuit as depicted in FIG. 1.
Figure 3:
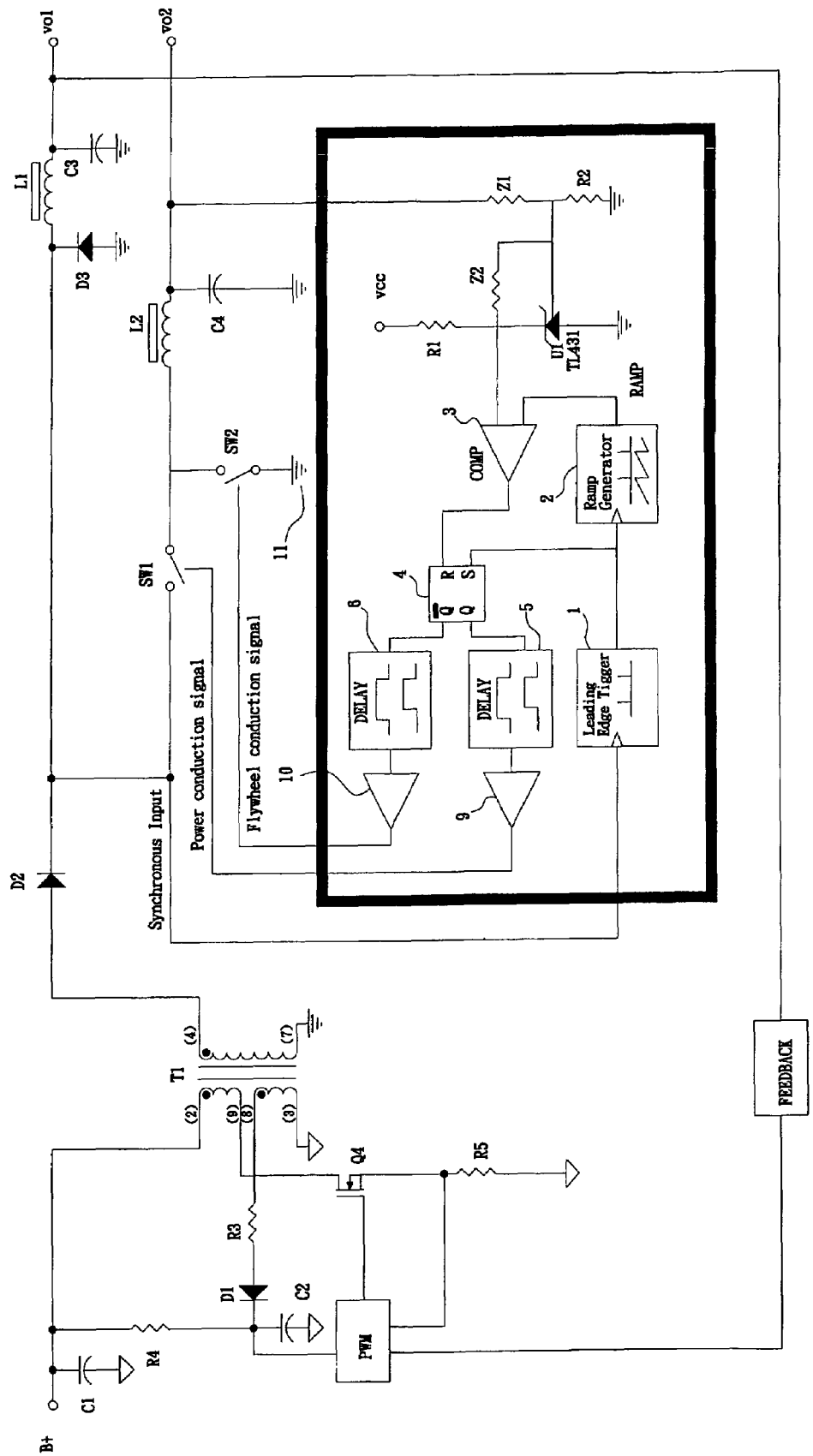
FIG. 3 is a circuit diagram of a control circuit in accordance with a preferred embodiment of the present invention.
Figure 5:
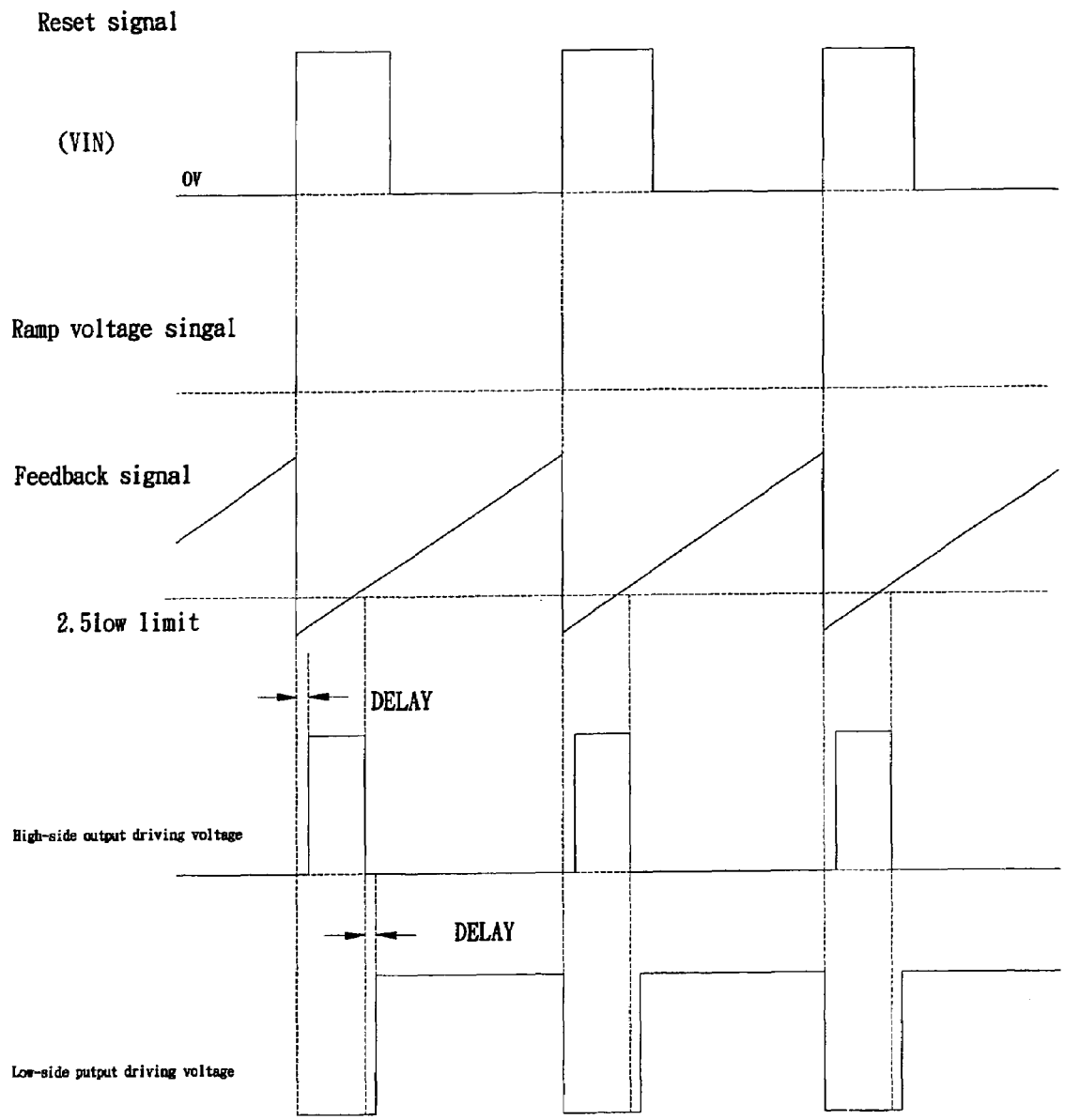
FIG. 5 is a waveform diagram of a control circuit in accordance with a preferred embodiment of the present invention.

Referring to FIGS. 3 and 5 for a circuit diagram and a waveform diagram of a control circuit in accordance with a preferred embodiment of the present invention respectively, the post regulation control circuit of a power supply of the invention comprises: a trigger circuit 1 coupled to a secondary inductor's input terminal of a power supply; a ramp generator 2 coupled to a trigger circuit 1; a first comparator 3 having a positive input terminal coupled to a ramp generator 2; a feedback regulation controller U1 coupled to a negative input terminal of a first comparator 3 and a second output terminal VO2 of a power supply, and the feedback regulation controller U1 sends a feedback voltage signal to the positive input terminal, and the feedback voltage signal is obtained by dividing the voltage of a voltage signal of the second output terminal VO2 by an impedance Z1 and a resistor R2 and then outputting the feedback voltage signal from the output terminal of the feedback regulation controller U1; a SR flip-flop 4 having a R input terminal coupled to a first output terminal of the first comparator and a S input terminal coupled to a trigger circuit 1; a first delay circuit 5 coupled to a positive Q output terminal of the SR flip-flop 4; a second delay circuit 6 coupled to an opposite Q output terminal of the SR flip-flop; a second inductor L2 coupled to second output terminal VO2; a first power switch SW1 coupled to a first output driver 9, a first inductor L1 and a second inductor L2; and a second power switch SW2 coupled to a second output driver 10, the first power switch SW1, the second inductor L2 and a reference ground 11. The input of the post regulation control circuit is a DC power or an AC power, and the trigger circuit 1 detects a voltage waveform at a leading edge or between a leading edge and a trailing edge of an input terminal of the first inductor L1 of the secondary side and triggers a pulse signal (leading edge trigger) to reset the voltage of the ramp generator 2, such that the voltage of the ramp generator 2 is discharged to a first positive voltage and then recharged to a second positive voltage, so as to produce a continuous ramp voltage. After the first comparator 3 compares the feedback voltage signal and the continuous ramp voltage, the output of first comparator and a pulse signal are inputted to a R input terminal and a S input terminal of the SR flip-flop 4 to produce a power conduction signal and a flywheel conduction signal respectively. After the power conduction signal is delayed by the first delay circuit 5, the power conduction signal is inputted to the first output driver 9 to control and conduct the first power switch SW1 (with a waveform HS-DRV), such that the power of the power supply is sent to the second output terminal VO2 and stored at the second inductor L2. If the power conduction signal is cut off, the first power switch SW1 will be disconnected. After the flywheel conduction signal is delayed by the second delay circuit 6, the flywheel conduction signal is inputted to the second output driver 10 to control and electrically conduct a second power switch SW2 (with a waveform LS-DRV), and the power stored at the second inductor L2 is sent to the second output terminal VO2.

Figure 4:
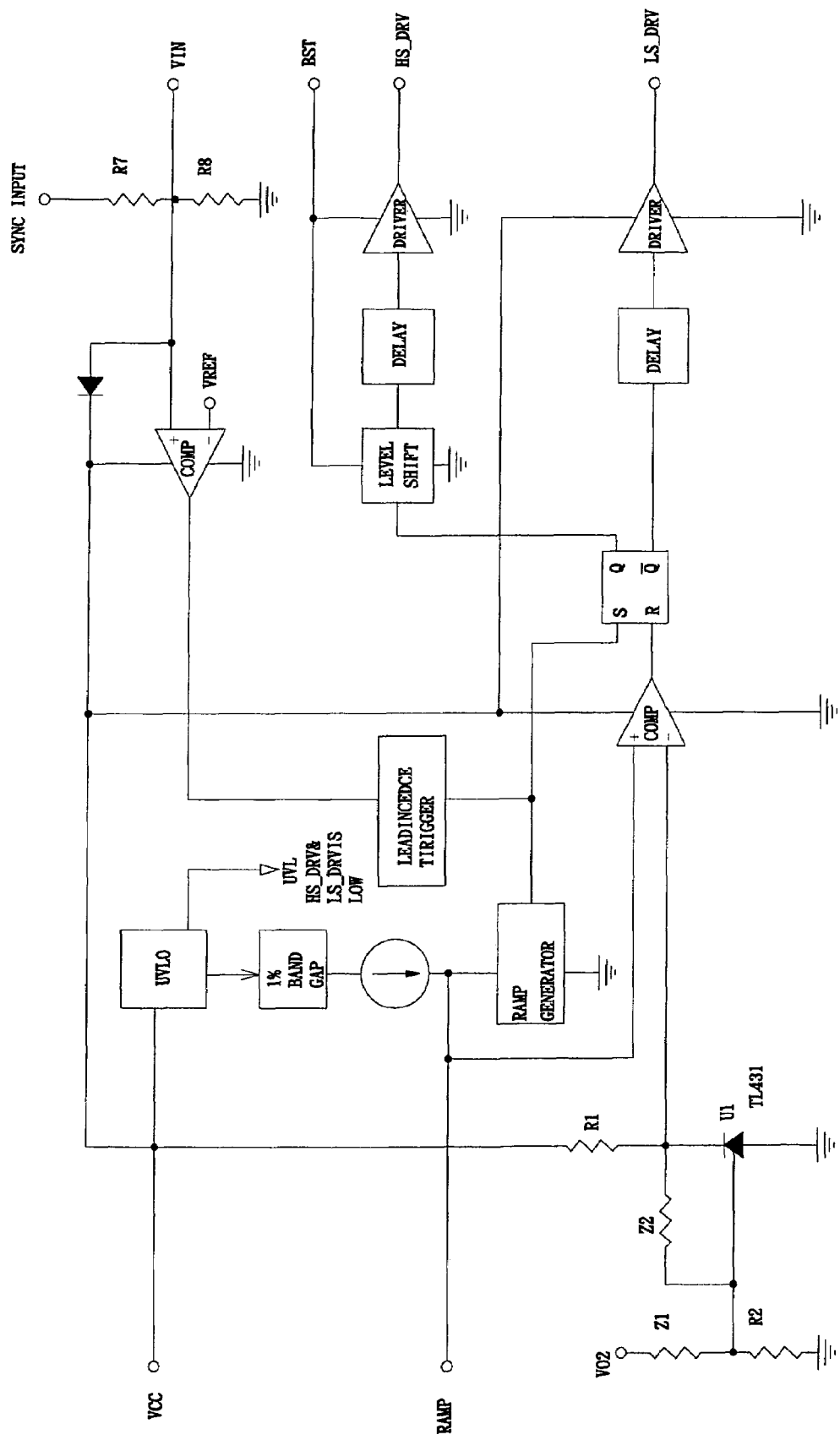
FIG. 4 is a circuit diagram of the details of a control circuit in accordance with a preferred embodiment of the present invention.

Referring to FIGS. 4 and 5 for a circuit diagram and a waveform diagram of a control circuit in accordance with a preferred embodiment of the present invention respectively, a lower and safer voltage of an external sync signal obtained by dividing the voltage by resistors R7, R8 is inputted to a positive input terminal of a second comparator 7, and the voltage division can filter an abnormal signal in a discontinuous conduction mode to give a stable sync signal. The second comparator 7 outputs a sync signal to the trigger circuit 1 (leading edge trigger) to generate a pulse signal to reset the ramp generator 2, so as to output a stable continuous ramp voltage. Further, a positive Q output terminal of the SR flip-flop 4 is coupled to a level shift circuit 8 and then coupled to a delay circuit 5, and the level shift circuit 8 boosts the voltage of the positive Q output terminal, such that the power conduction signal electrically conducts the first power switch SW1 (with a waveform HS-DRV). Since the first power switch SW1 is installed between the first inductor L1 and the second inductor L2, it is necessary to provide an output higher than a low-side driving voltage LS_DRV to normally conduct a first power switch SW1. Therefore, the level shift circuit 8 is needed to shift the voltage level upward, so that the high-side voltage HS_DRV can vary between the high-side voltage source and the reference ground 11.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A post regulation control circuit of a power supply, comprising:
  a trigger circuit, coupled to a secondary inductor of the secondary side of a transformer of said power supply;
  a ramp generator, coupled to said trigger circuit;
  a first comparator, having a positive input terminal coupled to said ramp generator;
  a feedback regulation controller, coupled to a negative input terminal of said first comparator and a second output terminal of said power supply, for sending a feedback voltage signal to said negative input terminal;
  a SR flip-flop, having a R input terminal coupled to a first output terminal of said first comparator and a S input terminal coupled to said trigger circuit;
  a first delay circuit, coupled to a positive Q output terminal of said SR flip-flop;
  a second delay circuit, coupled to an opposite Q output terminal of said SR flip-flop;
  a first inductor, coupled to a first output terminal of said power supply;
  a second inductor, coupled to said second output terminal;
  a first power switch, coupled to a first output driver, said first inductor and said second inductor; and
  a second power switch, coupled to a second output driver, said first power switch, said second inductor and a reference ground;
  wherein, said trigger circuit detects a voltage waveform at a leading edge or between a leading edge and a trailing edge that is inputted by said secondary inductor, and triggers a pulse signal to reset a voltage of said ramp generator, such that the voltage of said ramp generator is discharged to a first positive voltage and then recharged to a second positive voltage, and further produces a continuous ramp voltage, and after said first comparator compares said feedback voltage signal and said continuous ramp voltage, the output of said first comparator and said pulse signal are inputted into said R input terminal and said S input terminal of said SR flip-flop to produce a power conduction signal and a flywheel conduction signal, and after said power conduction signal is delayed by said first delay circuit, said power conduction signal is inputted to said first output driver to control and electrically conduct said first power switch, such that the power of said power supply is sent to said second output terminal and stored in said second inductor, and when said power conduction signal is cut off, said first power switch is disconnected, and after said flywheel conduction signal is delayed by said second delay circuit, said flywheel conduction signal is inputted to said second output driver to control and electrically conduct said second power switch, such that the power of said second inductor is stored and sent to said second output terminal.

2. The post regulation control circuit of a power supply of claim 1, wherein said feedback voltage signal is obtained by dividing the voltage of a voltage signal of said second output terminal by an impedance and a resistor and then sent to said feedback regulation controller.

3. The post regulation control circuit of a power supply of claim 1, further comprising two resistors and a second comparator, such that after a voltage is inputted by said secondary inductor and divided by said two resistors, a lower voltage is inputted to a positive input terminal of said second comparator, and sent to said trigger circuit, for filtering an abnormal signal in a discontinuous conduction mode.

4. The post regulation control circuit of a power supply of claim 1, further comprising a level shift circuit, installed between said SR flip-flop and said first delay circuit for raising the level of said positive Q output terminal voltage of said SR flip-flop and said power conduction signal electrically conducts said first power switch.

5. The post regulation control circuit of a power supply of claim 1, wherein said post regulation control circuit has an input of a DC power or an AC power.

* * * * *